UNITED STATES PATENT OFFICE.

FRANK JONES, OF MORSE, KANSAS.

INSECTICIDE.

SPECIFICATION forming part of Letters Patent No. 441,306, dated November 25, 1890.

Application filed October 1, 1890. Serial No. 366,755. (No specimens.)

*To all whom it may concern:*

Be it known that I, FRANK JONES, a citizen of the United States, residing at Morse, in the county of Johnson and State of Kansas, have invented or discovered a new and useful Compound for Destroying Insect Life on Plants, of which the following is a specification.

My invention relates to compounds designed to be used in the form of a spray for destroying insect life upon infested trees, shrubs, vines, and other plants.

The said compound is composed of the following ingredients in the specified proportions, to wit: lime-water, ten gallons; kerosene, twenty-four liquid ounces; indigo, two ounces dissolved in water, and asafetida tincture, eight ounces.

The lime-water is made in the proportion of seven or eight pounds of lime slaked in one barrel of water, using the clear water only.

The mixture is applied to all parts of the tree or infested plant in the form of spray in the usual manner of spraying plants.

If any injury to the leaves is observed, the compound may be weakened by adding more water thereto.

The asafetida may be dispensed with and satisfactory results obtained. I prefer, however, to use the mixture with asafetida, as specified.

Now, having described my invention, what I claim as new, and desire to secure by Letters Patent, is—

The compound for destroying insect life, composed of the following ingredients, substantially in the proportions specified, to wit: lime-water, ten gallons; kerosene, twenty-four liquid ounces; indigo, two ounces, with or without asafetida tincture.

FRANK JONES.

Witnesses:
JAMES R. TOWNSEND,
ALFRED I. TOWNSEND.